(12) United States Patent
Saiga et al.

(10) Patent No.: US 9,316,265 B2
(45) Date of Patent: Apr. 19, 2016

(54) TORQUE DAMPER APPARATUS

(71) Applicants: Kabushiki Kaisha F.C.C., Hamamatsu-shi (JP); Honda Motor Co., Ltd., Tokyo (JP)

(72) Inventors: Seiji Saiga, Hamamatsu (JP); Hiromi Fujiwara, Hamamatsu (JP); Hiroshi Asai, Hamamatsu (JP); Yasuhiro Morimoto, Wako (JP)

(73) Assignees: Kabushiki Kaisha F.C.C., Hamamatsu-shi (JP); Honda Motor Co., LTd., Tokyo (JP)

( * ) Notice: Subject to any disclaimer, the term of this patent is extended or adjusted under 35 U.S.C. 154(b) by 0 days.

(21) Appl. No.: 14/242,078

(22) Filed: Apr. 1, 2014

(65) Prior Publication Data
US 2014/0291098 A1   Oct. 2, 2014

(30) Foreign Application Priority Data

Apr. 1, 2013 (JP) ................................ 2013-076439

(51) Int. Cl.
| | |
|---|---|
| *F16H 45/02* | (2006.01) |
| *F16D 3/12* | (2006.01) |
| *F16F 15/12* | (2006.01) |
| *F16D 25/0638* | (2006.01) |

(52) U.S. Cl.
CPC . *F16D 3/12* (2013.01); *F16F 15/12* (2013.01); *F16H 45/02* (2013.01); *F16D 25/0638* (2013.01); *F16H 2045/0221* (2013.01); *F16H 2045/0284* (2013.01)

(58) Field of Classification Search
CPC ....................... F16H 2045/0221; F16F 15/121
See application file for complete search history.

(56) References Cited

U.S. PATENT DOCUMENTS

| 5,713,442 | A * | 2/1998 | Murata et al. ................ 192/3.29 |
| 6,244,401 | B1 * | 6/2001 | Maienschein et al. ......... 192/3.3 |
| 2003/0173175 | A1 * | 9/2003 | Tomiyama .................. 192/3.29 |

FOREIGN PATENT DOCUMENTS

| JP | 2010-048291 | 3/2010 |
| JP | 2011-185382 | 9/2011 |
| JP | 2011-208791 | 10/2011 |
| WO | WO 2013/065775 | 5/2013 |

* cited by examiner

*Primary Examiner* — Mark Manley
(74) *Attorney, Agent, or Firm* — Knobbe, Martens, Olson & Bear, LLP

(57) ABSTRACT

A torque damper apparatus including a multiple disc clutch lock-up clutch, damper springs arranged for damping variation of the torque transmitted via a hub gear, an urging member connected to the hub gear a fastener, and a torque transmitting member for holding the damper springs and outputting the torque transmitted from the urging member via the damper springs. The torque transmitting member can be formed with windows receiving the fastener. The hub gear and the urging member can be fastened together by the fastener within the windows.

18 Claims, 14 Drawing Sheets

TORQUE DAMPER APPARATUS

FIELD OF THE INVENTIONS

The present inventions relate to a torque damper apparatus for reducing torque variation output from an engine.

BACKGROUND OF THE INVENTIONS

In general, a torque converter used in an automobile with an AT (automatic transmission) has a cover and is filled with operating fluid (oil) with a pump rotating together with the cover, a turbine arranged oppositely to the pump, and a stator connected to a one-way clutch adapted to transmit rotation of pump to the turbine via the fluid while increasing the transmitting torque. Accordingly, the driving power of an engine can be amplified via the fluid and transmitted to the transmission and wheels.

A lock-up clutch apparatus arranged within the cover of torque converter is intended to reduce the loss of torque transmission as compared with the torque transmission via fluid by directly connecting the cover of torque converter and the turbine at an appropriate timing. Japanese Patent Document JP 2011-185382 A discloses a multiple disc type lock-up clutch apparatus arranged within a cover of a torque converter. The lock-up clutch comprises a clutch piston operable between an operated position and a non-operated position and is able to urge driving clutch discs arranged on the cover-side in the operated position, a hub gear for holding driven clutch discs arranged opposed to the driving clutch discs and able to transmit the power to the hub gear with being press-contacted with driving clutch discs when the clutch piston is in the operated position, and a torque transmitting member connected to the hub gear via damper springs and rotatable together with the hub gear to transmit the engine torque to the turbine of torque converter.

SUMMARY OF THE INVENTIONS

An aspect of at least one of the inventions disclosed herein includes the realization that, in the lock-up clutch apparatus of the JP 2011-185382 patent document, there is a problem that the axial dimension of the assembly of the urging member, the hub gear and the torque transmitting member is too large connecting the hub gear and the urging member together using more economical fastening means such as rivets. Such a problem can exist not only in the lock-up clutch apparatus of the JP 2011-185382 patent document, but also in a torque damper apparatus which can output the transmitted torque with damping torque variation by press-contacting the driving clutch discs and the driven clutch discs and releasing them.

It is, thus, another aspect of the least one of the inventions disclosed herein that a torque damper apparatus can achieve reduction of its axial dimension even when all the urging member, the hub gear and the torque transmitting member are assembled in the axial direction.

Thus, in accordance with an embodiment, a torque damper apparatus can comprise driving clutch discs and driven clutch discs of a multiple disc clutch configured to transmit the torque of an engine when being press-contacted each other and to cut-off the transmission of the torque of an engine when released from the press-contacted condition. A hub gear can be formed with a spline for holding the driven clutch discs and can be configured to receive the torque under the press-contacted condition of the driving and driven clutch discs. The torque damper apparatus can also include damper springs having spring characteristics for damping variation of the torque transmitted via the hub gear. An urging member can be united to the hub gear by fasteners for transmitting the torque from the hub gear to the damper springs by urging the damper springs. Additionally, a torque transmitting member can hold the damper springs and output the torque transmitted from the urging member via the damper springs. The torque transmitting member can be formed with windows containing the fasteners, and the hub gear and the urging member can be fastened together by the fastener within the windows.

In some embodiments where the torque transmitting member is formed with windows having a thickness dimension of the torque transmitting member sufficient to receive at least one fastener, and the hub gear and the urging member are fastened together by the fastener within at least one window, it is possible to provide a torque damper apparatus which can achieve reduction of its axial dimension even when the urging member, the hub gear and the torque transmitting member are assembled in the axial direction.

In some embodiments where each of the windows is an elongated aperture formed along an arcuate moving locus of the fastener, it is possible to reduce the axial dimension of the torque damper apparatus with keeping the operation of the hub gear and the urging member smooth.

In some embodiments where a radial width dimension of each window is sufficient to receive therein the radially outermost dimension of the hub gear and the radially innermost dimension of the urging member, and the radially outer dimension of the hub gear is smaller than the radially inner dimension of the urging member, it is possible to form axial openings functioning as oil passages in the windows between a radially outer edge face of the hub gear and a radially inner edge face of the urging member and thus to achieve smooth flow of operating fluid within the cover of torque converter.

In some embodiments where the fastener for fastening the hub gear and the urging member comprises one or more rivets, it is possible to reduce the axial dimension of the torque damper apparatus with keeping fastening strength of the hub gear and the urging member.

In some embodiments where the windows are arranged at a position axially corresponding to the multiple disc clutch comprising the driving clutch discs and the driven clutch discs, it is unnecessary to arrange the multiple disc clutch with avoiding the position of presence of the fastener having a large axial dimension and thus to improve freedom of layout of the multiple disc clutch.

In some embodiments where the radial movement of the hub gear and the urging member united together by the fastener relative to the torque transmitting member is limited by radially outward and inward edges of the openings of the windows, it is possible to firmly prevent the hub gear and the urging member from being radially displaced. Accordingly, the windows can be considered as providing functions of both reducing the axial dimension of the torque damper apparatus and preventing radial displacement of the hub gear and the urging member.

In some embodiments where the damper springs comprise primary damper springs and secondary damper springs, and the primary damper springs and the secondary damper springs are arranged on different coaxial circular arc lines and act as springs connected in series, it is possible to set a large torsion angle and reduce the spring rigidity of whole damper springs to achieve sufficient performance of vibration absorption.

In some embodiments where the torque damper apparatus is arranged within a cover of a torque converter of a vehicle and comprises a clutch piston movable between the operated position and non-operated position to press-contact driving clutch discs and driven clutch discs each other in the operated position, and the torque damper apparatus can transmit the torque of an engine to wheels via the torque converter when the clutch piston is in the non-operated position and transmit the torque of an engine to wheels without via the torque converter when the clutch piston is in the operated position, it is possible to suitably apply the torque damper apparatus of the present invention to the lock-up clutch apparatus.

DETAILED DESCRIPTION OF THE PREFERRED EMBODIMENT

Figure 1:
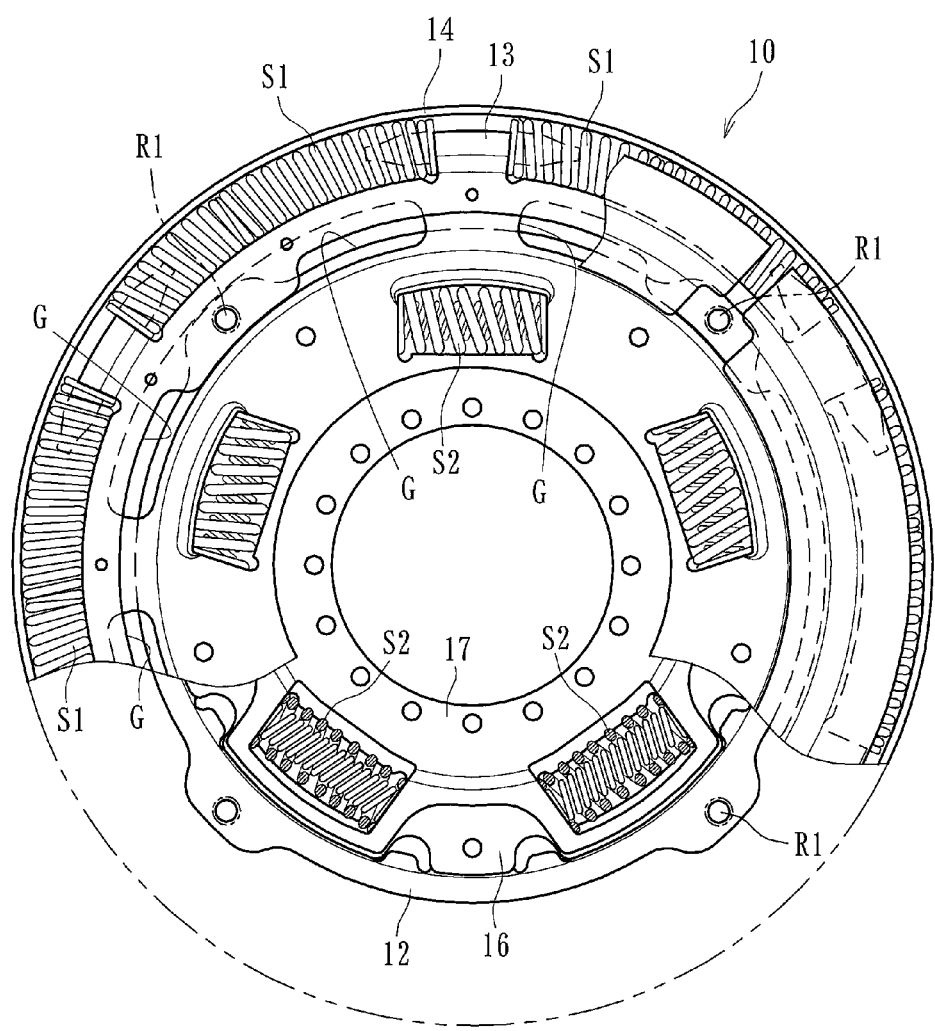
FIG. 1 is a partial cutaway, front elevation view of a torque damper apparatus according to an embodiment.

A torque damper apparatus 10 in accordance with some embodiments can include a lock-up clutch apparatus arranged within a torque converter (fluid coupling) 1. For example, as shown in FIGS. 1~13, the torque damper apparatus 10 can include a clutch piston 11, a hub gear 12, an urging member 13, a torque transmitting member 14, a multiple disc clutch 15 formed of driving clutch discs 15a and driven clutch discs 15b alternately arranged each other, a center plate 17, and damper springs (primary damper springs S1 and secondary damper springs S2).

Figure 2:
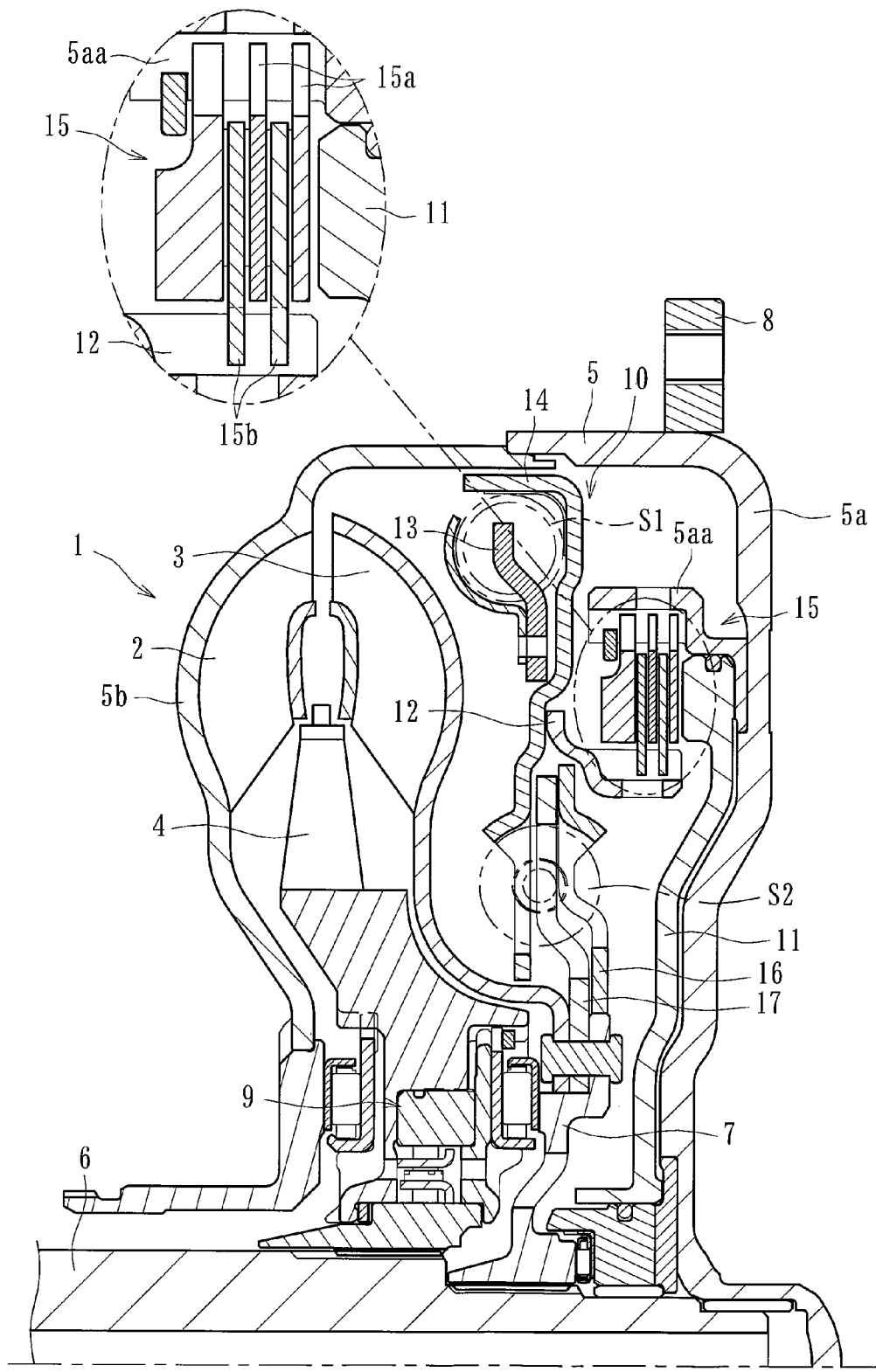
FIG. 2 is a longitudinal sectional view (sectioned except for the window) showing a torque converter with the torque damper apparatus of FIG. 1.
Figure 3:
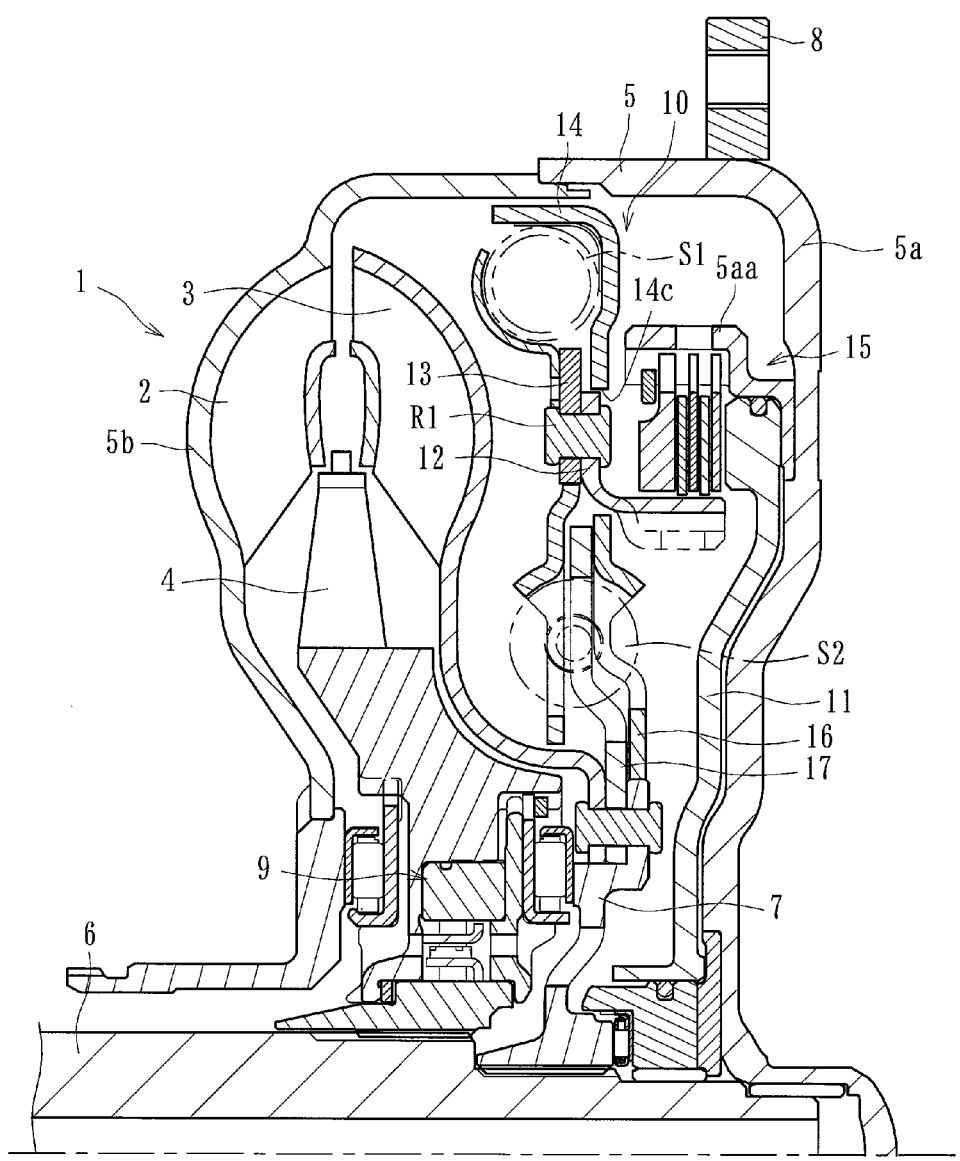
FIG. 3 is a longitudinal sectional view (sectioned through the window) showing the torque damper apparatus and the torque converter of FIG. 1.

The torque converter 1 can be used in an automobile with an AT (automatic transmission) and can be configured to transmit the torque of an engine to the transmission and wheels with amplifying the torque from an engine. The torque converter 1, in some embodiments, can comprise as shown in FIGS. 2 and 3, a cover 5 of the torque converter filled with fluid (operating oil) and rotated by the power of engine around an output shaft 6 of the torque converter 1. A pump 2 can be formed on a left-side wall 5b of the torque converter cover 5 and rotatable therewith. A turbine 3 can be arranged opposed to the pump 2 rotationally within a right-side wall 5a of the torque converter cover 5 and connected to the output shaft 6 via a turbine hub 7. Additionally, a stator 4 can be connected to a stator shaft (not shown) supported on the transmission (not shown) of a via an one-way clutch 9. The torque damper apparatus 10 forming the lock-up clutch apparatus can be contained within the torque converter cover 5 between the right-side wall 5a and the turbine 3.

The torque converter cover 5 (more particularly the right-side wall 5a of the cover 5) can be connected to a crankshaft (not shown) of engine via a connecting member 8 so that the torque (driving power) of engine can be transmitted to the torque converter cover 5. When the cover 5 and pump 2 are rotated by the driving power of engine, the rotational torque can be transmitted to the turbine 3 via the fluid (operating oil) with torque being amplified. Accordingly, the rotation of the turbine 3 with its torque being amplified causes rotation of the output shaft 6 spline-engaged with the turbine 3 via the turbine hub 7 and thus the torque is then transmitted to the transmission of a vehicle.

The lock-up clutch apparatus can comprise the torque damper apparatus 10 and the clutch piston 11 and can be configured to reduce the loss of torque transmission as compared with the torque transmission via fluid by directly connecting the cover 5 of torque converter and the turbine 3 (i.e. mechanical connection) at an appropriate timing. That is, the torque damper apparatus 10 can transmit the torque of an engine to wheels via the torque converter 1 when the clutch piston 11 is in the non-operated position (non-directly connected condition) and can transmit the torque of an engine to wheels without via the torque converter 1 when the clutch piston 11 is in the operated position (directly connected condition). In other words, when the clutch piston 11 is in the non-operated position, torque from the engine passes through the pump P, into the hydraulic fluid within the cover, then into the turbine 3 and then to the wheel. On the other hand, when the clutch piston 11 is in the operated position, torque from the engine passes from the cover 5, through the clutch 15, to the torque damper 10 which is directly connected to the turbine three and the shaft six. Thus, when the clutch piston 11 is in the operated position, torque from the engine can be considered as not passing through the torque converter 1.

The clutch piston 11 can be displaced between an operated position (left-side position in FIGS. 2 and 3) and a non-operated position (right-side position in the same) by applying an operating pressure with fluid (operating oil) between the clutch piston 11 and the right-side wall 5a of the torque converter cover 5 and by releasing the operating pressure therefrom. The driving clutch discs 15a are slidably fitted on a spline formed on a secured portion 5aa integrally projected from the right-side wall 5a of the torque converter cover 5 and thus allowed to be shifted to left and right directions but not allowed to be rotated relative to the secured portion 5aa. In the operated position, the driving clutch discs 15a are pressed against the driven clutch discs 15b by the clutch piston 11.

Figure 4:
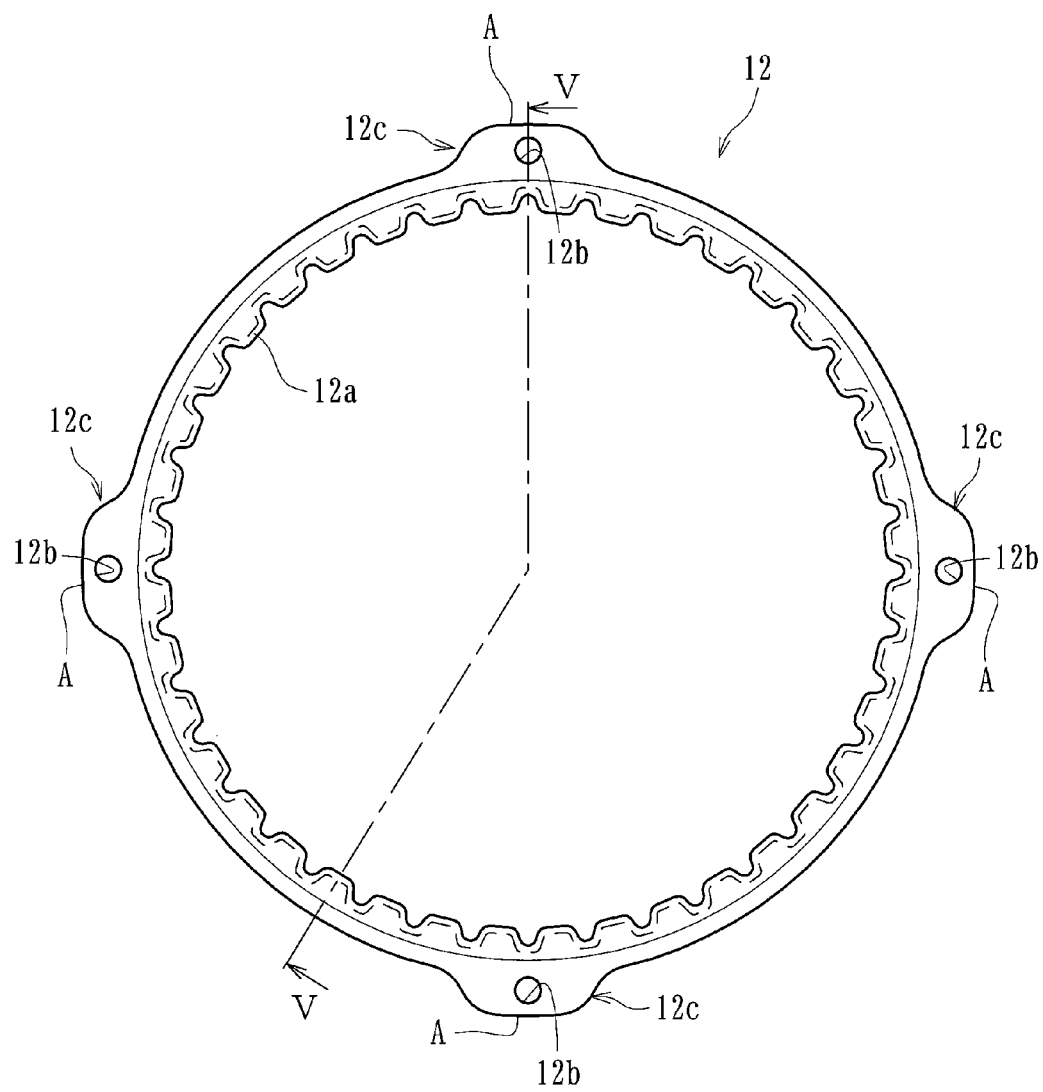
FIG. 4 is a front elevation view showing the hub gear of the torque damper apparatus.
Figure 5:
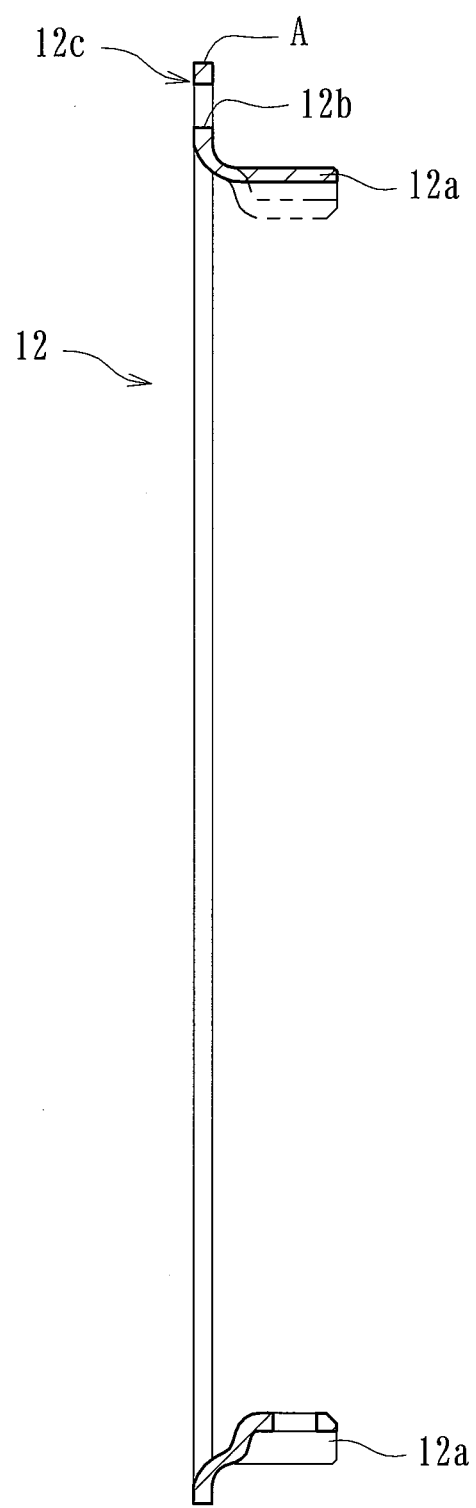
FIG. 5 is a sectional view taken along a line V-V in FIG. 4.

As shown in FIGS. 4 and 5, the hub gear 12 can be formed with a spline 12a for slidably supporting the plurality of driven clutch discs 15b and the driving torque of engine can be transmitted to the hub gear 12 under the press-contacted condition of the driving clutch discs 15a and the driven clutch discs 15a in the operated position of the clutch piston 11. A plurality (four in the illustrated embodiment) of radially outwardly projected portions 12c are arranged along the periphery of the hub gear 12 and each projected portion 12c can be formed with an aperture 12b through which a rivet R1, described later more in detail, can be passed.

Thus, the driving clutch discs 15a and the driven clutch discs 15b are press-contacted each other and the engine torque can be transmitted to the hub gear 12 when the clutch piston 11 can be shifted from the non-operated position to the operated position. The driven clutch discs 15b can be slidably fitted on a spline formed on the hub gear 12 and thus allowed to be shifted to left and right directions in FIGS. 1 and 2 but not allowed to be rotated relative to the hub gear 12.

Each of the driven clutch disc 15b can be formed of a substantially annular member (in plan view) and linings (frictional members) are attached to the annular surfaces. When the driving clutch discs 15a and the driven clutch discs 15b are press-contacted by the clutch piston 11 in the operated position, they are connected via frictions of the linings (torque transmittable condition). On the contrary, when the operating pressure acting on the clutch piston 11 can be released and the clutch piston 11 can be returned to the non-operated position, the press-contact between the driving clutch discs 15a and the driven clutch discs 15b and thus connection of them is released (transmission of torque is cut-off).

Figure 6:
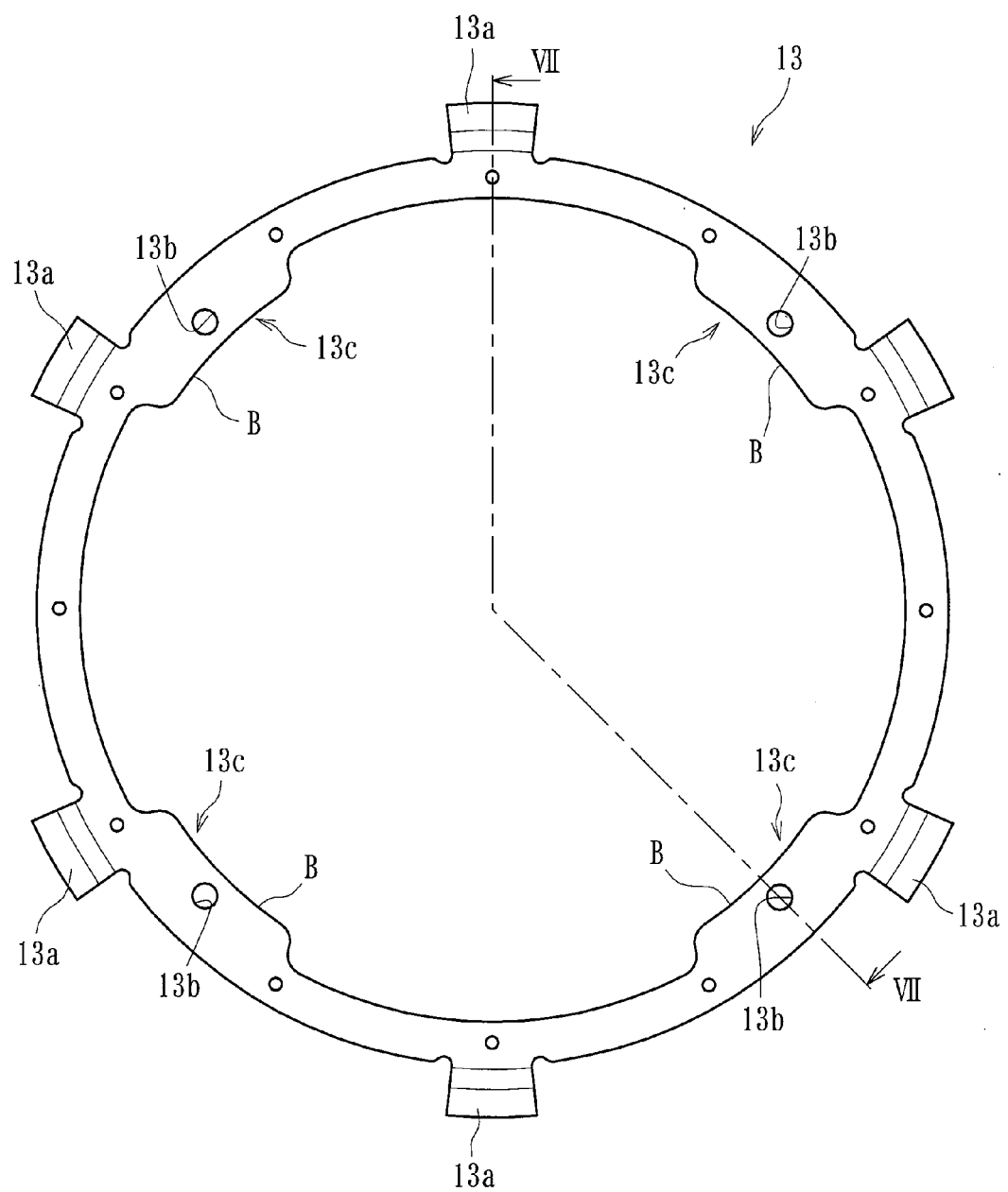
FIG. 6 is a front elevational view showing the urging member of the torque damper apparatus.
Figure 7:
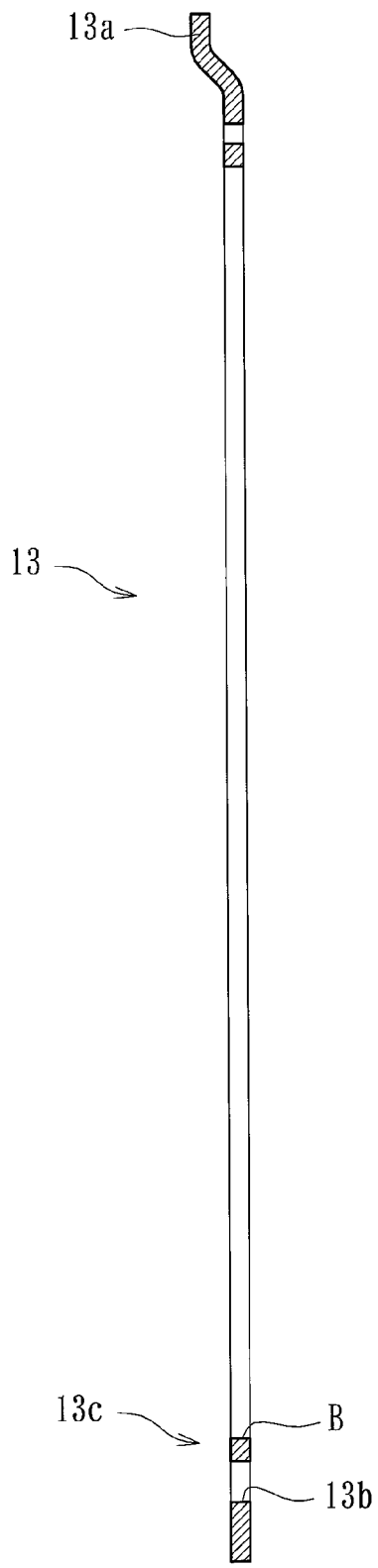
FIG. 7 is a sectional view taken along a line VII-VII in FIG. 6.

The urging member (also called as a damper spring plate) 13 can be fastened and united to the hub gear 12 by rivets (which can serve as fastening means) R1 and adapted to transmit the torque from the hub gear 12 to the damper springs (primary damper springs S1 in the illustrated embodiment). As shown in FIGS. 6 and 7, each urging member 13 can be formed with a plurality of radially outwardly projections 13a (six in the illustrated embodiment) and radially inwardly projections 13c (four in the illustrated embodiment) along the circumference of the urging member 13. Each projection 13c can be formed with an aperture 13b through which the rivet R1 can be passed.

Figure 15:
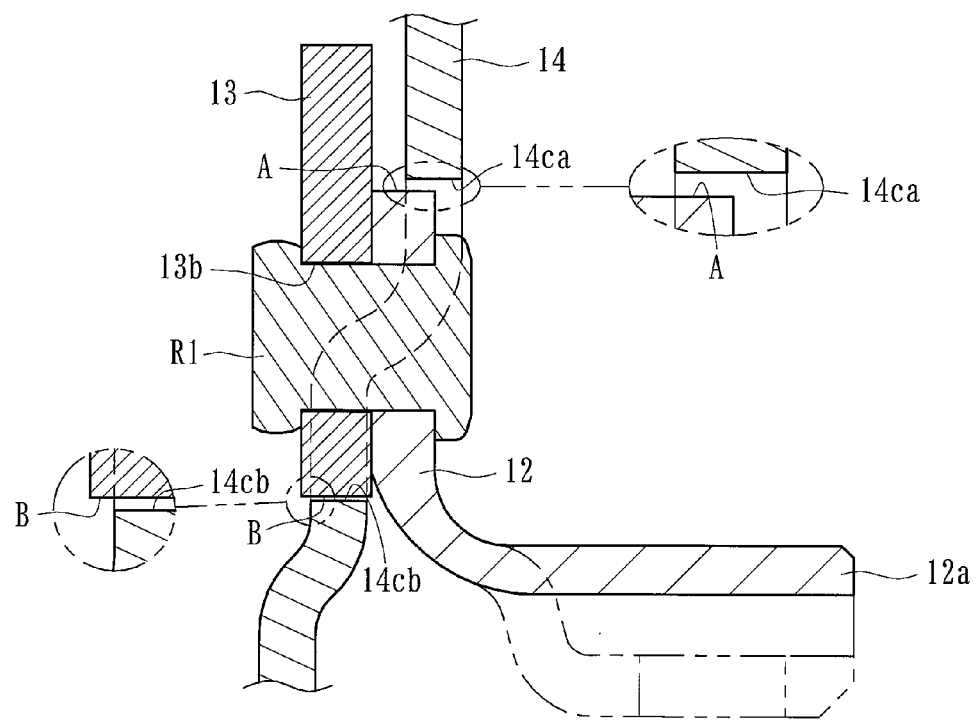
FIG. 15 is a sectional view showing a condition of fastening means positioned in the window.

The hub gear 12 and the urging member 13 can be united together by superposing them each other so that the through apertures 12b and the through apertures 13b are aligned and by inserting rivets R1 into the through apertures 12b, 13b and caulking them as shown in FIG. 15. The hub gear 12 and the urging member 13 can be united together by using any other conventional fastening means such as bolt-nut means.

Figure 8:
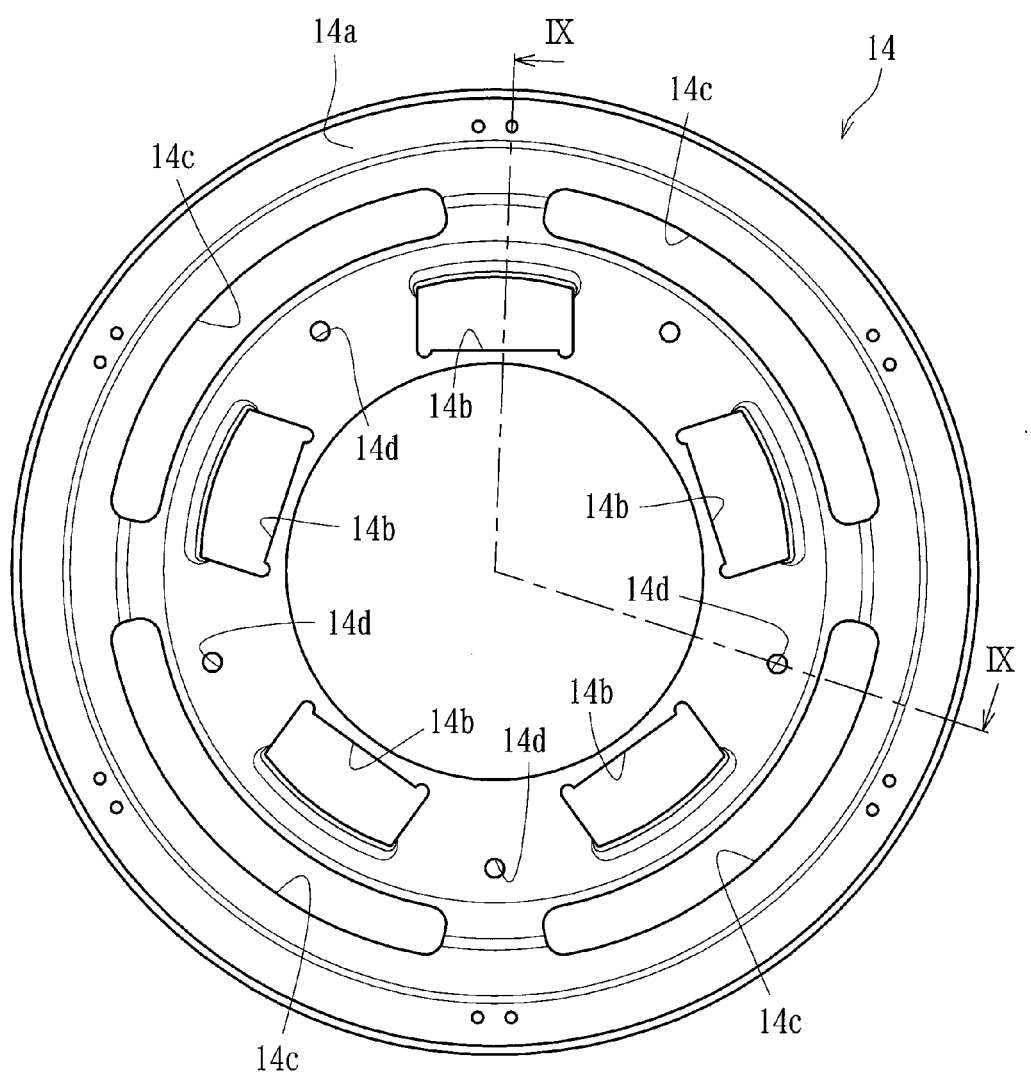
FIG. 8 is a front elevational view showing the torque transmitting member of the torque damper.
Figure 9:
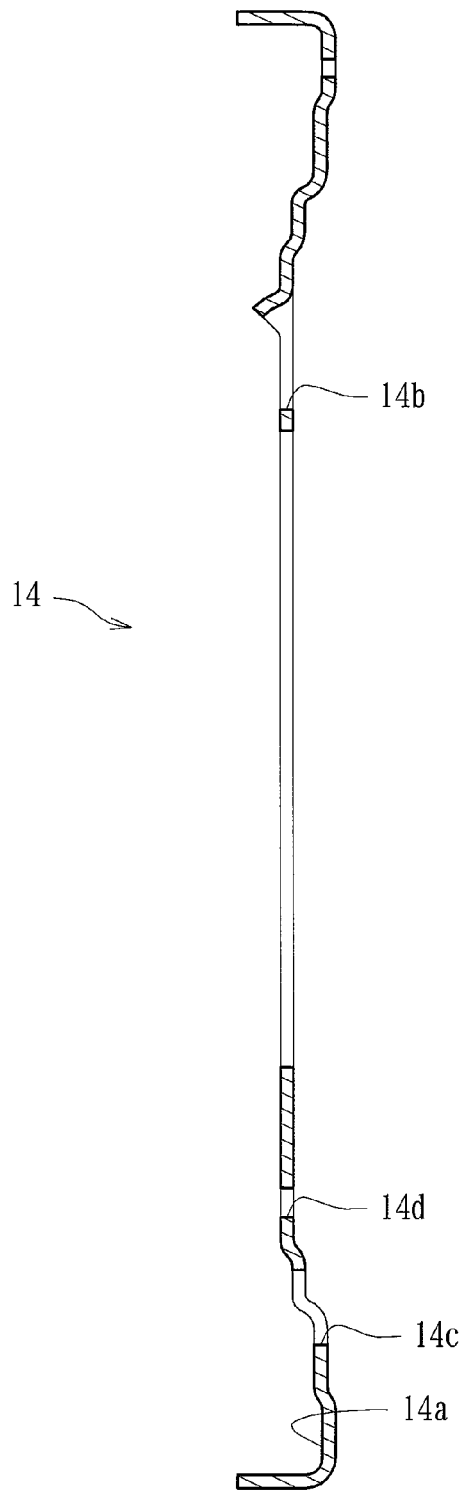
FIG. 9 is a sectional view taken along a line IX-IX in FIG. 8.

The torque transmitting member (also called as a damper plate) 14 can be adapted to hold the damper springs (primary damper springs S1 and secondary damper springs S2 in the illustrated embodiment) and to output the torque transmitted from the hub gear 12 and the urging member 13 via the damper springs to the output shaft 6 via the turbine hub 7. As shown in FIGS. 8 and 9, the torque transmitting member 14 can be formed with a receiving recess 14a for receiving the primary damper springs S1, receiving apertures 14b for receiving the secondary damper springs S2, a plurality (four in the illustrated embodiment) of windows 14c each having an elongated circular arc configuration, and through apertures 14d.

The primary damper springs S1 and the secondary damper springs S2 can be coil springs receiving the engine torque via the hub gear 12 and the urging member 13 and having the spring characteristics for damping the torque variation. In the present embodiment, the damper springs S1, S2 comprises arc-shaped coil springs each being curved as having a circular arc configuration along their expandable direction. Each the primary damper springs S1 and the secondary damper springs S2 may be formed by combination of straight coil springs arranged as having a circular arc configuration in place of coil spring having the arc-shaped configuration.

The urging member 13 and the torque transmitting member 14 can be structured so that urging portions 13a (FIGS. 6 and 7) of the urging members 13 can be positioned at the ends of the primary damper springs S1 when the urging member 13 and the torque transmitting member 14 are in an assembled condition and accordingly, urging portions 13a can urge and compress the primary damper springs S1 when the hub gear 12 and the urging member 13 are rotated due to input of the engine torque from the multiple disc clutch (lock-up clutch) 15 to them. Thus, the torque transmitted to the hub gear 12 and the urging member 13 are further transmitted to the torque transmitting member 14 via primary damper springs S1 and accordingly the torque variation can be absorbed by the primary damper spring S1.

Figure 10:
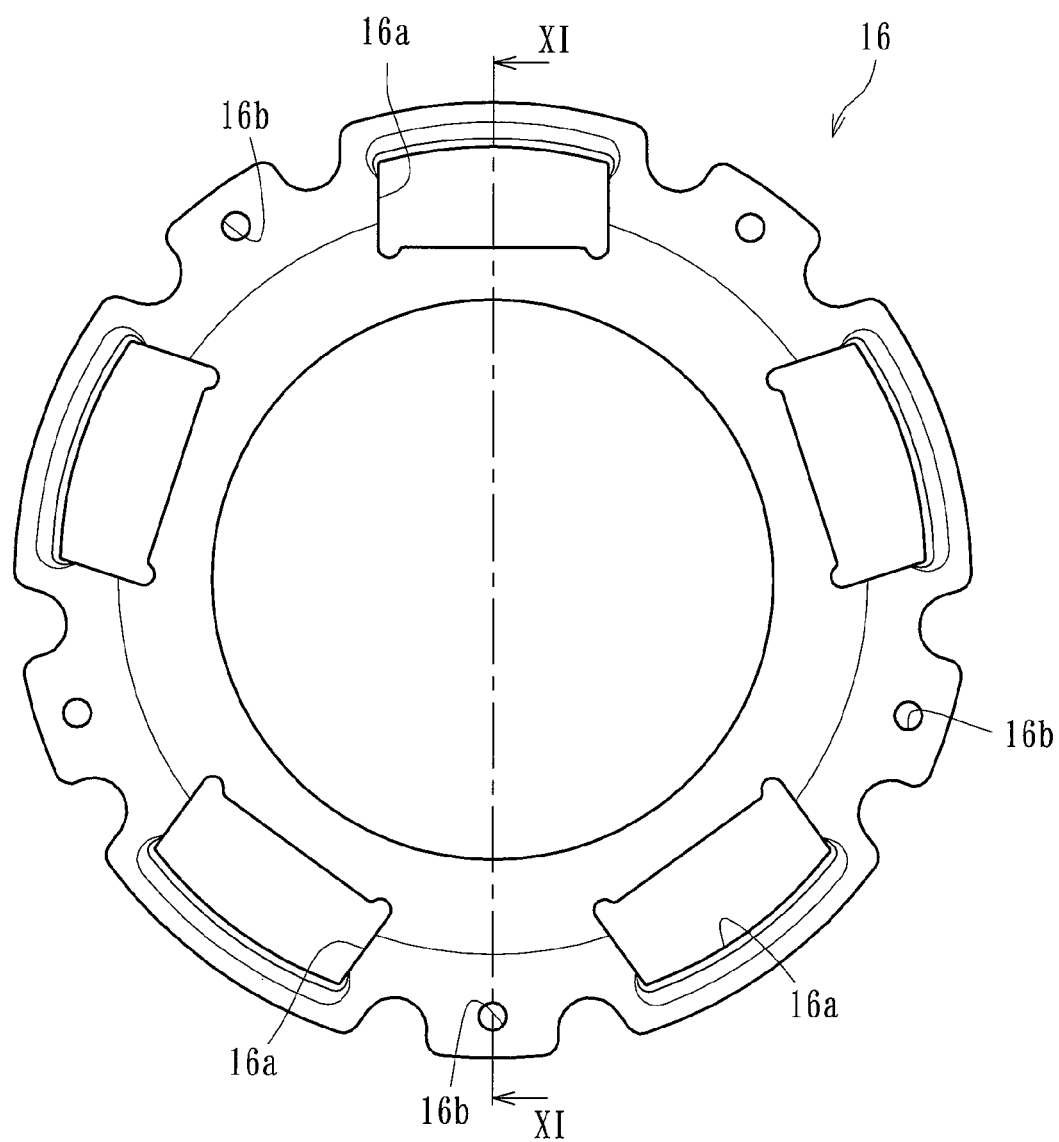
FIG. 10 is a front elevational view showing the side plate of the torque damper apparatus.
Figure 11:
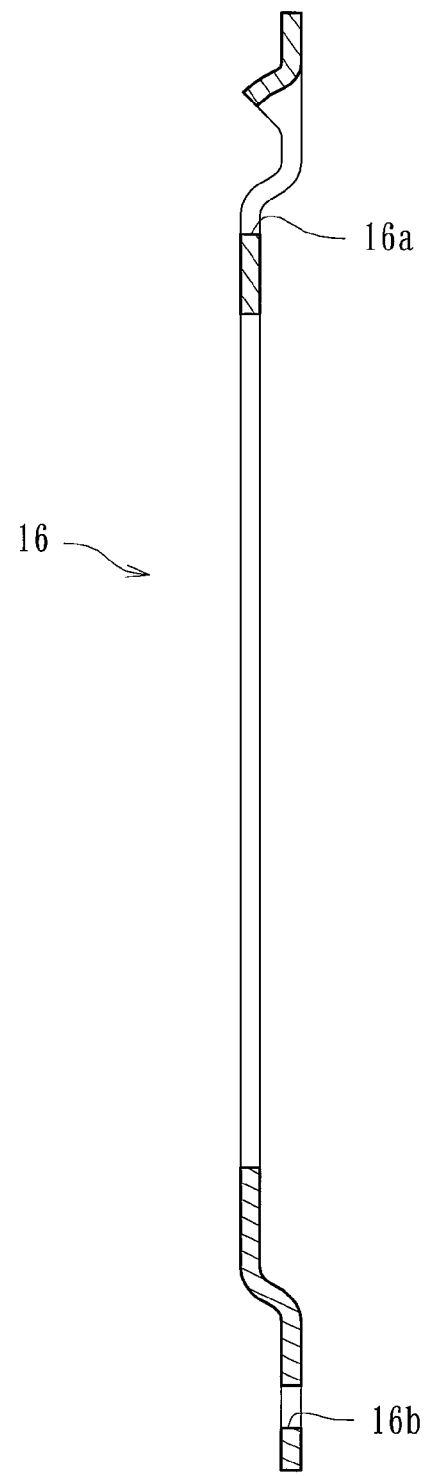
FIG. 11 is a sectional view taken along a line XI-XI in FIG. 10.

As shown in FIGS. 10 and 11, the side plate 16 comprises a substantially disc-shaped member and can be formed with receiving apertures 16a for receiving the secondary damper springs S2 having configuration and position corresponding to the receiving apertures 14b of the torque transmitting member 14 and formed with through apertures 16b corresponding to the through apertures 14d of the torque transmitting member 14. The torque transmitting member 14 and the side plate 16 can be united together by superposing them each other so that the through apertures 14d and the through apertures 16b are aligned and by inserting rivets (not shown) into the through apertures 14d, 16b and caulking them.

Figure 12:
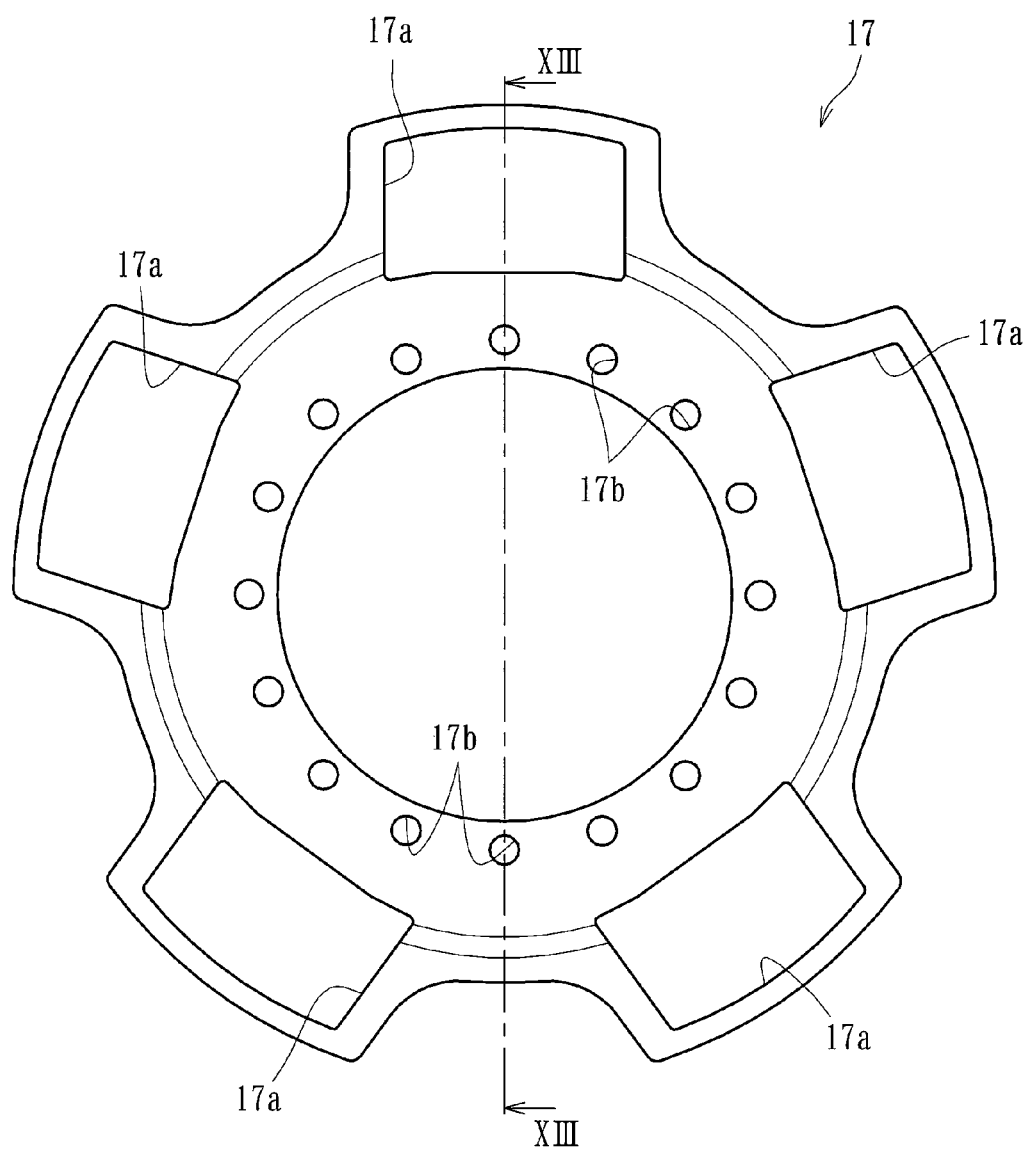
FIG. 12 is a front elevational view showing the center plate of the torque damper apparatus.
Figure 13:
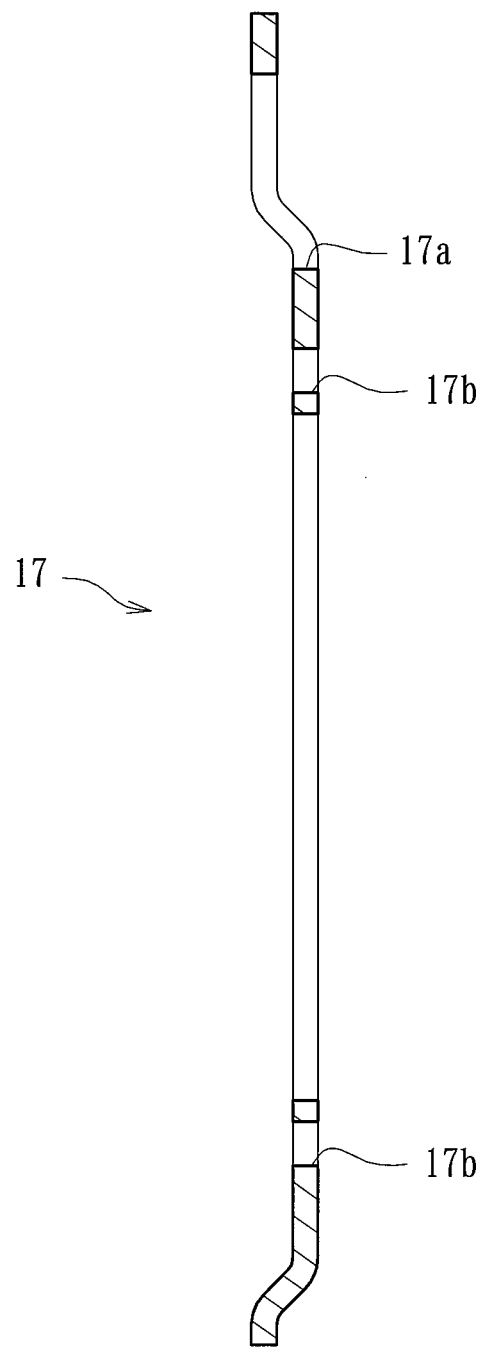
FIG. 13 is a sectional view taken along a line XIII-XIII in FIG. 12.

As shown in FIGS. 12 and 13, the center plate 17 comprises a substantially disc-shaped member and can be formed with receiving apertures 17a for receiving the secondary damper springs S2 having configuration and position corresponding to the receiving apertures 14b of the torque transmitting member 14 and the receiving apertures 16a of the side plate 16 and formed with through apertures 17b through which the rivets R2 can be passed. Thus, the torque damper apparatus 10 can be connected to the turbine hub 7 as shown in FIGS. 2 and 3 by aligning the through apertures 17b and through apertures (not shown) formed in the turbine hub 7 and by inserting the rivets R2 into the through apertures 17b and the through apertures of the turbine hub 7 and caulking them.

The secondary damper springs S2 can be received in the receiving apertures 14b of the torque transmitting member 14, the receiving apertures 16a of the side plate 16 and the receiving apertures 17a of the center plate 17 under a condition of the torque transmitting member 14, the side plate 16 and the center plate 17 being assembled. Accordingly, the secondary damper springs S2 can be compressed by edges of openings of the receiving apertures 14b of the torque transmitting member 14 and edges of openings of the receiving apertures 16a of the side plate 16 during rotation of the torque transmitting member 14 and the side plate 16 after the engine torque from the multiple disc clutch 15 has been transmitted to the torque transmitting member 14 via the primary damper springs S1. That is, the torque transmitted to the torque transmitting member 14 and the side plate 16 can be further transmitted to the center plate 17 via the secondary damper springs S2 and thus the torque variation can be absorbed by the secondary damper springs S2.

In some embodiments of the torque damper apparatus 10, the primary damper springs S1 and secondary damper springs S2 can be arranged on different coaxial circular arc lines (i.e. primary damper springs S1 can be radially outward and secondary damper springs S2 can be radially inward) and they also can be arranged so as to act as springs connected in series. Accordingly, it is possible to set a large torsion angle and reduce the spring rigidity of whole damper springs S1, S2 to achieve sufficient performance of vibration absorption. In addition, the primary damper springs S1 and secondary damper springs S2 can have different spring characteristics (e.g. differences in diameter, number of turns, etc.) so as to have appropriate spring rigidity.

According to the structure described above, when the driving clutch discs 15a and the driven clutch discs 15b are press-contacted by the clutch piston 11, the hub gear 12 and the urging member 13 are rotated by a predetermined rotational angle. Thus, the primary damper springs S1 are compressed and rotate the torque transmitting member 14 and the side plate 16 to the same direction by a predetermined rotational angle, and then the secondary damping springs S2 are compressed and rotate the center plate 17 to the same direction to output the torque to the turbine hub 7. Accordingly, the primary damping springs S2 and the secondary damping springs act as springs connected in series and perform the function of vibration absorption.

As shown in FIGS. 3, 8 and 15, the torque transmitting member 14 can be formed with windows 14c having a thickness dimension (i.e. axial width dimension of a bent portion having a stepped configuration in cross-section) of the torque transmitting member 14 able to contain therein the rivets R1 (which can serve as fastening means), and the hub gear 12 and the urging member 13 are united together by the rivets R1 within the windows 14c. For example, each window 14c is an elongated through aperture (FIG. 8) formed at a position corresponding to the rivet R1 so that it can receive the rivet R1 along its arcuate moving locus when the rivet R1 can be moved together with the hub gear 12 and the urging member 13.

With reference to FIG. 15, it is possible to axially "overlap" or contain whole projected portions (e.g. head or caulked portion) of the rivet R1, the hub gear 12 and the urging member 13 within the thickness dimension i.e. axial width dimension of the window 14c of the torque transmitting member 14. That is, in some embodiments, it is possible to reduce the axial dimension of the torque damper apparatus 10 by the axially "overlapped" dimension described above.

Figure 14:
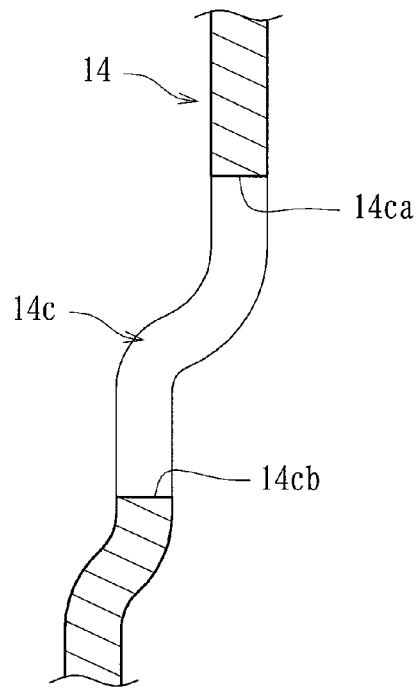
FIG. 14 is a sectional view showing the window formed in the torque transmitting member of the torque damper apparatus.

As clearly shown in FIG. 14, the windows 14c can be formed in a bent portion of the torque transmitting member 14 having a stepped configuration in cross-section, and one edges 14ca of the openings of the windows 14c are in positions axially different from those of other edges 14cb of the openings of the windows 14c so that end faces "A" of the projections 12c (FIG. 4) are opposed to said one edges 14ca via a small gap and end faces "B" of the projections 13c (FIG. 6) are opposed to said other edges 14cb via a small gap as shown in FIG. 15 when the hub gear 12 and the urging member 13 united by the rivets R1 are assembled to the torque transmitted member 14. That is, radial movement of the hub gear 12 and the urging member 13 united together by the fastening means R1 can be limited by said one edges 14ca and said other edges 14cb of the openings of the windows 14c.

For example, when the hub gear 12 and the urging member 13 united by the rivets R1 are displaced radially outward relative to the torque transmitting member 14, the end faces "A" of the projections 12c of the hub gear 12 abut said one edges 14ca of the openings of the windows 14c and thus the displacement radially outward of the hub gear 12 and the urging member 13 can be prevented. Similarly, radially inward displacement of the hub gear 12 and the urging member 13 can be prevented due to abutment of the end faces "B" of the projections 13c of the urging member 13 against said other edges 14cb of the openings of the windows 14c.

In addition, in some embodiments, a radial width dimension of each window 14c can be set so that it can include therein the radially outermost dimension of the hub gear 12 and the radially innermost dimension of the urging member 13, and the radially outer dimension of the hub gear 12 can be set smaller than the radially inner dimension of the urging member 13. This enables formation of openings i.e. oil passages "G" (FIG. 1) in the windows 14c between radially outer edge faces of the hub gear 12 and radially inner edge faces of the urging member 13 and thus it can be possible to achieve smooth flow of operating fluid within the cover 5 of torque converter 1.

In embodiments where the torque damper apparatus 10 is arranged within the torque converter 1 in which the multiple disc clutch (lock-up clutch) 15 can be also contained, it can be possible to smoothly circulate the operating fluid in the torque converter 1 through the oil passages "G" and thus to suppress increase of the inside pressure of the torque converter 1. Accordingly, no pressure increase of the operating oil for the multiple disc clutch 15 is required in association with the increase of inside pressure of the torque converter 1.

In addition, since the windows 14c are arranged at a position axially corresponding to the multiple disc clutch 15 comprising the driving clutch discs 15a and the driven clutch discs 15b, it is unnecessary to arrange the multiple disc clutch 15 with avoiding the position of presence of the rivet (fastening means) R1 having a large axial dimension and thus to improve freedom of layout of the multiple disc clutch 15. Furthermore, since the oil passages "G" are formed in the windows 14c, it can be possible to lead the operating fluid of the torque converter 1 to the multiple disc clutch 15 through the oil passages "G" and thus to surely perform operation of the multiple disc clutch 15.

In embodiments where the torque transmitting member 14 is formed with windows 14c having a thickness dimension of the torque transmitting member able to contain therein the fastening means R1, and the hub gear 12 and the urging member 13 are fastened together by the fastening means R1 within the windows 14c, it can be possible to provide a torque damper apparatus 10 which can achieve reduction of its axial dimension even when whole the urging member 13, the hub gear 12 and the torque transmitting member 14 are assembled in the axial direction. In addition, according to the present invention, since each of the windows 14c can be an elongated aperture formed along an arcuate moving locus of the fastening means (rivets) R1, it can be possible to reduce the axial dimension of the torque damper apparatus 10 with keeping the operation of the hub gear 12 and the urging member 13 smooth. In this case, since the fastening means for fastening the hub gear 12 and the urging member 13 comprises rivets R1, it can be possible to reduce the axial dimension of the torque damper apparatus 10 with keeping fastening strength of the hub gear 12 and the urging member 13.

Further, in embodiments where the radial movement of the hub gear 12 and the urging member 13 united together by the fastening means R1 relative to the torque transmitting member 14 are limited by radially outward and inward edges of the openings of the windows 14c, it can be possible to firmly prevent the hub gear 12 and the urging member 13 from being radially displaced. Accordingly, the windows 14c can be considered as providing functions of both reducing the axial dimension of the torque damper apparatus 10 and preventing radial displacement of the hub gear 12 and the urging member 13.

Further, in embodiments where the damper springs comprise the primary damper springs S1 and the secondary damper springs S1, and the primary damper springs S1 and the secondary damper springs S2 are arranged on different coaxial circular arc lines and act as springs connected in series, it can be possible to set a large torsion angle and reduce the spring rigidity of whole damper springs to achieve sufficient performance of vibration absorption.

Finally, in embodiments where the torque damper apparatus 10 is arranged within a cover 5 of a torque converter 1 of a vehicle and comprises a clutch piston 11 movable between the operated position and non-operated position to press-contact driving clutch discs 15a and driven clutch discs 15b each other in the operated position, and the torque damper apparatus 10 can transmit the torque of an engine to wheels via the torque converter 1 when the clutch piston 11 can be in the non-operated position and transmit the torque of an engine to wheels without via the torque converter 1 when the clutch piston 11 can be in the operated position, it can be possible to suitably apply the torque damper apparatus 10 to the lock-up clutch apparatus.

The present inventions have been described with reference to some embodiments. Obviously, modifications and alternations will occur to those skilled in the art upon reading and understanding the preceding detailed description. For example, size and configuration of the window 14c may be modified in accordance with the size and configuration of the hub gear and urging member etc. In addition, although it has been described that the torque damper apparatus can be applied to the lock-up clutch in which the engine torque can be transmitted to wheels of vehicle via the torque converter when the clutch piston can be in the non-operated position and without via the torque converter when the clutch piston can be in the operated position, it can be possible to apply the torque damper apparatus to vehicles that do not include a torque converter.

In addition, although it has been described that the damper springs comprise primary damper springs S1 and secondary damper springs S2, and that the primary damper springs S1 and the secondary damper springs S2 are arranged on different coaxial circular arc lines and act as springs connected in series, the damper springs may be formed of only primary springs (i.e. springs arranged on only one circular arc) or of primary and secondary damper springs acting as springs connected in parallel.

The present inventions can be applied to any torque damper apparatus having different configuration or other additional functions, including, but without limitation, torque damper apparatuses which are provided with the torque transmitting members formed with windows having a thickness dimension able to contain therein the fastening means, and in which the hub gear and the urging member are fastened in the windows.

What is claimed is:

1. A torque damper apparatus comprising:
   driving clutch discs and driven clutch discs of a multiple disc clutch configured to transmit torque of an engine when press-contacted to each other and to cut-off the transmission of the torque when released from the press-contacted condition;
   a hub gear formed with a spline for holding the driven clutch discs and adapted to receive the torque under the press-contacted condition of the driving and driven clutch discs;
   damper springs having spring characteristics for damping variation of the torque transmitted via the hub gear;
   an urging member united to the hub gear by fastening means for transmitting the torque from the hub gear to the damper springs by urging the damper springs; and
   a torque transmitting member holding the damper springs and outputting the torque transmitted from the urging member via the damper springs;
   wherein the torque transmitting member comprises windows having a thickness dimension of the torque transmitting member sufficient to receive the fastening means, and wherein the hub gear and the urging member are fastened together by the fastening means within the windows, wherein at least a portion of the hub gear, at least a portion of the urging member, and at least a portion of the fastening means are disposed within the window.

2. A torque damper apparatus of claim 1, wherein each of the windows is an elongated aperture extending along an arcuate moving locus of the fastening means.

3. A torque damper apparatus of claim 2, wherein a radial width dimension of each window is sufficient to include therein a radially outermost dimension of the hub gear and a radially innermost dimension of the urging member, and wherein the radially outer dimension of the hub gear is smaller than the radially inner dimension of the urging member.

4. A torque damper apparatus of claim 1, wherein the fastening means comprises rivets.

5. A torque damper apparatus of claim 1, wherein the windows are arranged at a position radially corresponding to the multiple disc clutch, and the windows can accommodate the fastening means within the window.

6. A torque damper apparatus of claim 1, wherein the radial movement of the hub gear and the urging member united together by the fastening means is limited by radially outward edges of the windows and radially inward edges of the windows.

7. A torque damper apparatus of claim 6, wherein the windows are formed in a bent portion of the torque transmitting member having a stepped configuration in cross-section, and wherein radial movement of the hub gear and the urging member united together by the fastening means is limited by edges of the windows.

8. A torque damper apparatus of claim 1, wherein the damper springs comprise primary damper springs and secondary damper springs, and wherein the primary damper springs and the secondary damper springs are arranged on different coaxial circular arc lines so as to act as springs connected in series.

9. A torque damper apparatus of claim 1, wherein the torque damper apparatus is arranged within a cover of a torque converter of a vehicle and comprises a clutch piston movable between the operated position and non-operated position to press-contact driving clutch discs and driven clutch discs toward each other in the operated position, and wherein the torque damper apparatus is configured to transmit the torque of an engine to wheels via the torque converter when the clutch piston is in the non-operated position and to transmit the torque of an engine to wheels without the torque converter when the clutch piston is in the operated position.

10. A torque damper apparatus comprising:
    driving clutch discs and driven clutch discs of a multiple disc clutch configured to transmit torque of an engine when press-contacted to each other and to cut-off the transmission of the torque when released from the press-contacted condition;
    a hub gear formed with a spline holding the driven clutch discs and adapted to receive the torque under the press-contacted condition of the driving and driven clutch discs;
    damper springs having spring characteristics for damping variation of the torque transmitted via the hub gear;
    an urging member connected to the hub gear by a fastener so as to transmit the torque from the hub gear to the damper springs; and
    a torque transmitting member holding the damper springs and outputting the torque transmitted from the urging member via the damper springs;
    wherein the torque transmitting member comprises at least one window receiving the fastener, and wherein at least a portion of the hub gear, at least a portion of the urging member, and at least a portion of the fastener are disposed within the window.

11. A torque damper apparatus of claim 10, wherein each of the windows comprises an arcuate elongated aperture.

12. A torque damper apparatus of claim 11, wherein a radial width dimension of each window is sufficient to include therein a radially outermost dimension of the hub gear and a radially innermost dimension of the urging member, and wherein the radially outer dimension of the hub gear is smaller than the radially inner dimension of the urging member.

13. A torque damper apparatus of claim 10, wherein the fastener comprises a rivet.

14. A torque damper apparatus of claim 10, wherein the window is arranged at a position radially corresponding to the multiple disc clutch, and the windows can accommodate the fastener within the window.

15. A torque damper apparatus of claim 10, wherein the radial movement of the hub gear and the urging member is limited by interference between the fastener and radially outward edges of the window and radially inward edges of the window.

16. A torque damper apparatus of claim 15 wherein the window is formed in a bent portion of the torque transmitting member having a stepped configuration in cross-section, and wherein radial movement of the hub gear and the urging member is limited by edges of the window.

17. A torque damper apparatus of claim 10 wherein the damper springs comprise primary damper springs and secondary damper springs, and wherein the primary damper springs and the secondary damper springs are arranged on different coaxial circular arc lines so as to act as springs connected in series.

18. A torque damper apparatus of claim 10, wherein the torque damper apparatus is arranged within a cover of a torque converter of a vehicle and comprises a clutch piston movable between the operated position and non-operated position to press-contact driving clutch discs and driven clutch discs toward each other in the operated position, and wherein the torque damper apparatus is configured to transmit the torque of an engine to wheels via the torque converter when the clutch piston is in the non-operated position and to transmit the torque of an engine to wheels without the torque converter when the clutch piston is in the operated position.

* * * * *